United States Patent
Ahn et al.

(10) Patent No.: US 8,553,980 B2
(45) Date of Patent: Oct. 8, 2013

(54) METHOD AND APPARATUS EXTRACTING FEATURE POINTS AND IMAGE BASED LOCALIZATION METHOD USING EXTRACTED FEATURE POINTS

(75) Inventors: Sung Hwan Ahn, Anyang-si (KR); Kyung Shik Roh, Seongnam-si (KR); Suk June Yoon, Seoul (KR); Seung Yong Hyung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 444 days.

(21) Appl. No.: 12/844,259

(22) Filed: Jul. 27, 2010

(65) Prior Publication Data
US 2011/0038540 A1    Feb. 17, 2011

(30) Foreign Application Priority Data
Aug. 11, 2009   (KR) .................. 10-2009-0073730

(51) Int. Cl.
*G06K 9/34*    (2006.01)
(52) U.S. Cl.
USPC ........................................... 382/173; 348/94

(58) Field of Classification Search
USPC ................. 382/100, 103, 106, 164, 168–171, 382/173, 181, 190, 195, 276, 291, 225–228; 348/61, 94; 386/224, 227
See application file for complete search history.

(56) References Cited

U.S. PATENT DOCUMENTS

| | | | | |
|---|---|---|---|---|
| 6,529,613 | B1 * | 3/2003 | Astle | 382/103 |
| 7,627,178 | B2 * | 12/2009 | Suzuki et al. | 382/190 |
| 8,036,430 | B2 * | 10/2011 | Tokuse | 382/112 |
| 8,103,056 | B2 * | 1/2012 | Krishnaswamy et al. | 382/103 |
| 8,229,166 | B2 * | 7/2012 | Teng et al. | 382/103 |
| 2005/0213818 | A1 * | 9/2005 | Suzuki et al. | 382/190 |

* cited by examiner

*Primary Examiner* — Anand Bhatnagar
(74) *Attorney, Agent, or Firm* — Staas & Halsey LLP

(57) ABSTRACT

Disclosed herein are a method and apparatus for extracting feature points using hierarchical image segmentation and an image based localization method using the extracted feature points. An image is segmented using an affinity degree obtained using information observed during position estimation, new feature points are extracted from segmented areas in which registered feature points are not included, and position estimation is performed based on the new feature points. Accordingly, stable and reliable localization may be performed.

17 Claims, 7 Drawing Sheets

METHOD AND APPARATUS EXTRACTING FEATURE POINTS AND IMAGE BASED LOCALIZATION METHOD USING EXTRACTED FEATURE POINTS

CROSS-REFERENCE TO RELATED APPLICATIONS

This application claims the benefit of Korean Patent Application No. 2009-0073730, filed on Aug. 11, 2009 in the Korean Intellectual Property Office, the disclosure of which is incorporated herein by reference.

BACKGROUND

1. Field

Example embodiments relate to a method and apparatus for extracting feature points using hierarchical image segmentation and an image based localization method using the extracted feature points.

2. Description of the Related Art

In order to allow a mobile object to perform localization without information about an environment and to establish information about the environment, localization and mapping are simultaneously and organically performed. This is called Simultaneous Localization and Mapping (SLAM).

In general, a SLAM algorithm may be applied to an image based localization system to analyze image information so as to perform localization. Existing research into such image based localization suggests a random selection method and a uniform segmentation method as an image segmentation method performed in a preprocessing procedure for localization.

In the random selection method, in order to extract new feature points from an image, areas which do not overlap with registered feature points are randomly selected and feature points are extracted from the selected areas.

In the uniform segmentation method, a current image is segmented into areas having a constant size and new feature points are extracted only when registered feature points are not included in the areas.

However, in the random selection method, if many feature points are extracted from a specific area, the feature points may be non-uniformly extracted from the overall area. In the uniform segmentation method, the number of extracted feature points may not be larger than the number of segmented areas. If localization performance deteriorates due to an actual environment or if feature points having similar feature amounts are extracted from repeated image patterns, there is no corresponding portion. Thus, data association performance may deteriorate or localization may fail.

SUMMARY

Therefore, it is an aspect of the example embodiments to provide a method and apparatus for extracting feature points using hierarchical image segmentation and an image based localization method using the extracted feature points.

Additional aspects of the example embodiments will be set forth in part in the description which follows and, in part, will be apparent from the description, or may be learned by practice of the description.

The foregoing and/or other aspects are achieved by providing a method of extracting feature points, the method including: acquiring an image obtained by photographing an environment of a mobile object; segmenting the image according to an affinity degree of the acquired image; and extracting the feature points necessary for position estimation from a plurality of segmented areas obtained by segmenting the image.

The extracting of the feature points may include extracting all feature points from the image, matching all the extracted feature points with registered feature points used for position estimation, and detecting new feature points.

The matching of the feature points may include determining that the feature points are the new feature points if the feature amounts of the feature points are not similar to each other and determining that the feature points are the registered feature points if the feature amounts are similar and the segmented areas to which the feature points belong are identical.

If the registered feature points are included in at least one of the segmented areas, new feature points may be extracted from segmented areas in which the registered feature points are not included.

The plurality of segmented areas may be configured by images having the same characteristics.

The segmenting of the image may include calculating affinity measures between pixels with respect to all pixels of the image, configuring an affinity matrix containing the calculated affinity measures as an element value, comparing the magnitude of an Eigen value of the affinity matrix with reference values, and setting the segmented areas.

The reference values may be differentially set in correspondence with the segmented areas.

The range of the reference values may be adjusted such that the number of segmented areas is changed.

The affinity measures may be defined by Equation 1 using information observed during position estimation:

$$m(X1,X2)=\exp[-\{(|d(X1)-d(X2)|)/\sigma 2d\}-\{(|i(X1)-i(X2)|)/\sigma 2i\}-\{(|c(X1)-c(X2)|)/\sigma 2c\}] \quad \text{Equation 1}$$

where, X1 and X2 denote pixel coordinates, $|d(X1)-d(X2)|$ denotes a distance between two pixels in a space, $|i(X1)-i(X2)|$ denotes a difference in brightness level between two pixels, $|c(X1)-c(X2)|$ denotes a difference in material between two pixels, $\sigma 2d$ denotes a parameter to differentiate a distance difference, $\sigma 2i$ denotes a parameter to differentiate a brightness difference, and $\sigma 2c$ denotes a parameter to differentiate a material difference.

The mobile object may be any one of a mobile robot, a mobile phone and a camcorder, and may take a photograph using a single camera provided in any one of the mobile robot, the mobile phone and the camcorder.

The foregoing and/or other aspects are achieved by providing an apparatus of extracting feature points, the apparatus including: an image input unit to provide an image obtained by photographing an environment using a camera provided in a mobile object; and a localization unit to analyze the image acquired by the image input unit so as to perform position estimation, wherein the localization unit performs position estimation using feature points extracted from a plurality of areas which are segmented according to an affinity degree of the acquired image.

The localization unit may include a feature point extractor to provide feature point information corresponding to the feature points extracted from the segmented areas, and a feature point registration unit to register the feature point information.

The feature point extractor may configure an affinity matrix containing affinity measures between pixels with respect to all pixels of the image, analyze an Eigen value of the affinity matrix, and set the segmented areas.

The feature point extractor may calculate the affinity measures using distance information, brightness information and material information of the pixels observed during position estimation.

The localization unit may further include a motion estimator to simultaneously estimate the positions of the feature points and the position and attitude information of the camera using a localization algorithm with registration information of the feature point registration unit, and a feature point matching unit to match feature points used by the motion estimator during position estimation with feature points extracted from a current image by the feature point extractor and to detect new feature points.

The feature point matching unit may distinguish between new feature points and registered feature points depending on whether the feature amounts of the feature points and the segmented areas to which the feature points belong are identical.

The feature point extractor may detect the new feature points with the help of the feature point matching unit and provide only feature point information of the new feature points extracted from the segmented areas, in which the registered feature points are not included, among the segmented areas to the feature point registration unit.

The foregoing and/or other aspects are achieved by providing an image based localization method of analyzing an image photographed by a camera of a mobile object so as to perform position estimation, the method including: segmenting the image according to an affinity degree of the image acquired by the camera; extracting feature points necessary for position estimation from a plurality of segmented areas obtained by segmenting the image; registering a position estimation state variable to estimate filter state information corresponding to the extracted feature points and position and attitude information of the camera; and simultaneously estimating the positions of the feature points and the position and attitude information of the camera using a localization algorithm with registration information.

Affinity measures may be calculated using distance information, brightness information and material information of pixels observed during position estimation, an affinity matrix containing the affinity measures as an element value may be configured according to the calculated affinity measure, and the magnitude of an Eigen value of the affinity matrix may be compared with predetermined reference values so as to set the segmented areas.

All the feature points extracted from the image may be matched with registered feature points used for position estimation so as to detect new feature points, and only feature point information of the new feature points extracted from the segmented areas in which the registered feature points are not included may be added so as to update registration information.

Since new feature points are extracted from segmented areas in which registered feature points are not included, the feature points are uniformly acquired from an overall image and position estimation may be performed using the feature points. Accordingly, stable and reliable localization may be performed. In addition, localization performance may be prevented from deteriorating due to the influence of an actual environment.

Additional aspects and/or advantages will be set forth in part in the description which follows and, in part, will be apparent from the description, or may be learned by practice of the description.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
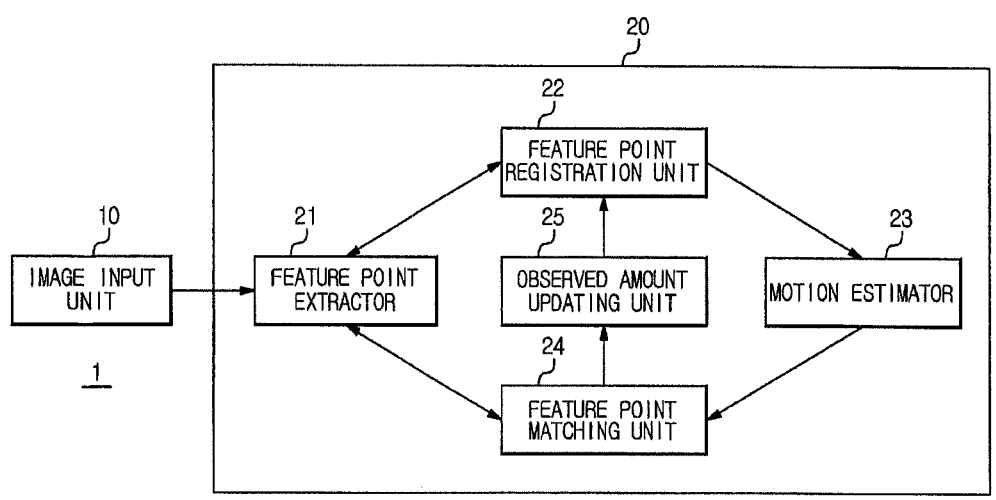
FIG. 1 is a block diagram showing an image based localization system according to example embodiments.

Reference will now be made in detail to the embodiments, examples of which are illustrated in the accompanying drawings, wherein like reference numerals refer to like elements throughout. The embodiments are described below to explain the present disclosure by referring to the figures.

Figure 2A:
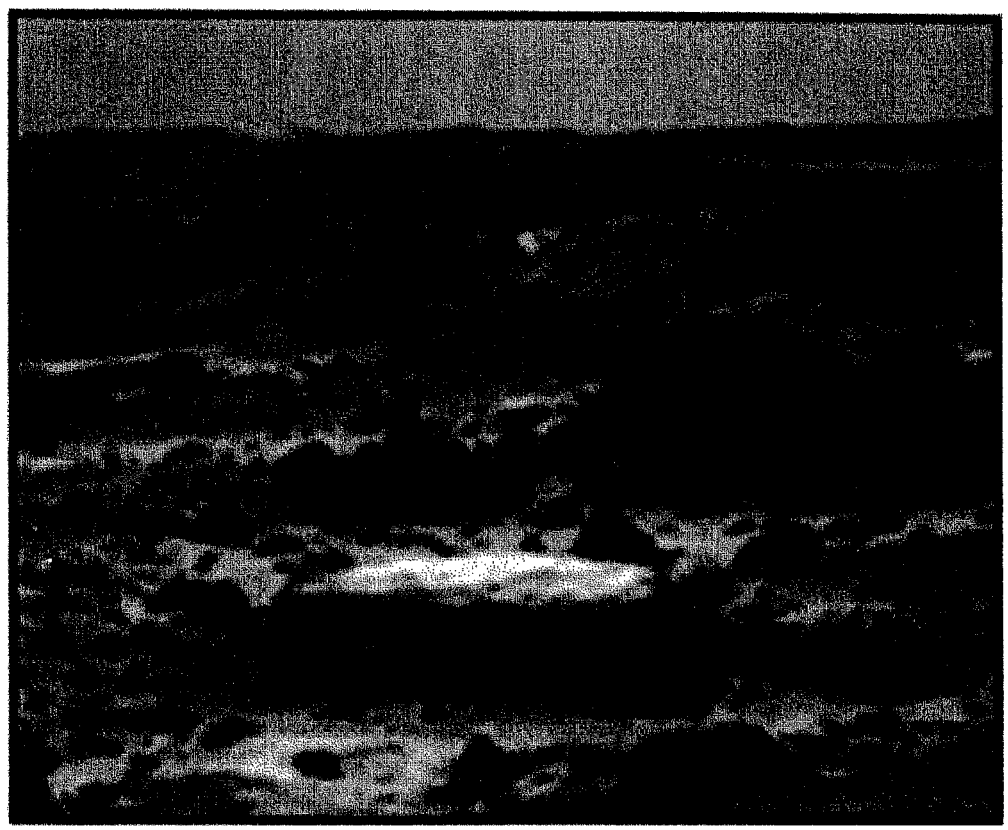
FIG. 2A is a view showing an actual image and FIG. 2B is a view showing an example of segmenting the actual image into images having the same characteristics.
Figure 2B:
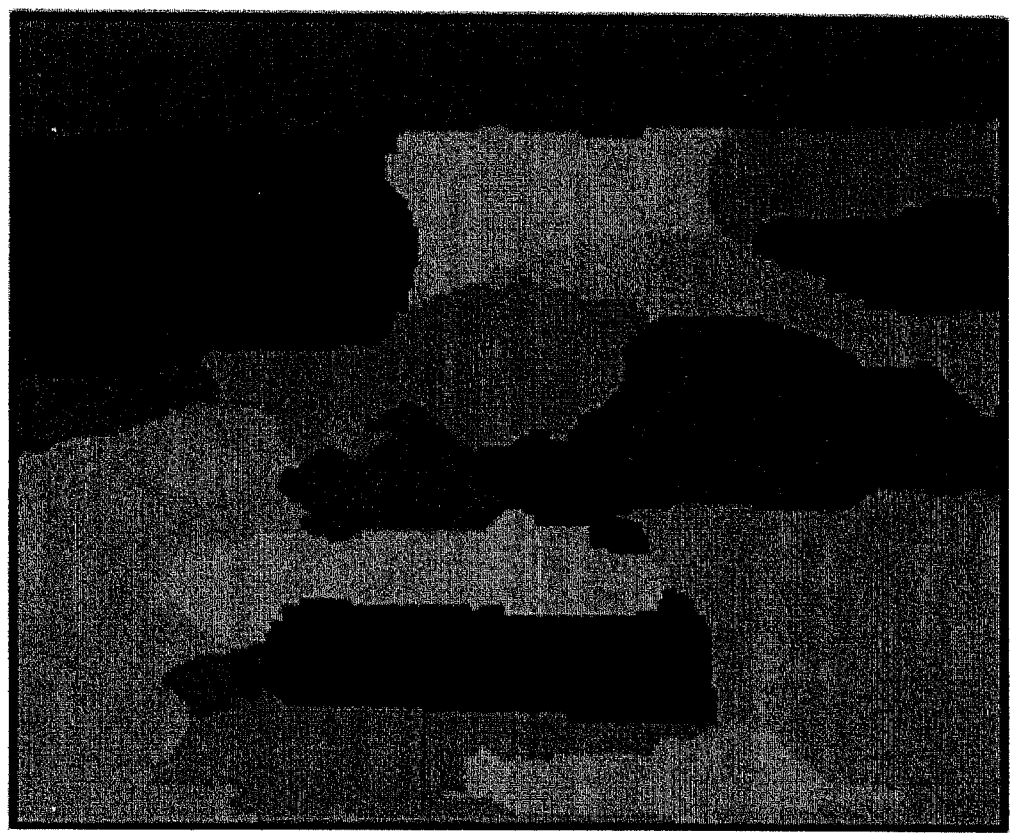

FIG. 1 is a block diagram showing an image based localization system according to example embodiments, FIG. 2A is a view showing an actual image, and FIG. 2B is a view showing an example of segmenting the actual image into images having the same characteristics.

Referring to FIG. 1, an image based localization system 1 includes an image input unit 10 and a localization unit 20.

The image input unit 10 provides an image photographed by a camera provided in a mobile object to the localization unit 20. The mobile object may include a device including a photographing function, such as a mobile robot, a mobile phone or a camcorder, and acquires image information using a camera. In an embodiment, the camera may be a single camera.

The localization unit 20, which receives the image obtained by photographing an environment of the mobile object from the image input unit 10, analyzes the image information, and estimates the positions of feature points and the position and attitude information of the camera.

The localization unit 20 includes a feature point extractor 21, a feature point registration unit 22, a motion estimator 23, a feature point matching unit 24, and an observed amount updating unit 25.

The feature point extractor 21 sends feature point information of the feature points extracted from the input image to the feature point registration unit 22. The feature points may be extracted using a Harris corner extraction method or a Scale Invariant Feature Transform (SIFT) algorithm.

The extracted feature point information is registered in the feature point registration unit 22 as a state variable of a filter corresponding to feature points necessary for localization. Then, the feature point registration unit 22 provides registration information including the state variable of the filter corresponding to the feature points necessary for localization to the motion estimator 23. The state variable of the filter is a state variable to estimate the positions of the feature points, and the registration information includes not only the state variable of the filter of the feature points but also position estimation state variables to estimate the position and attitude information of the camera.

The motion estimator 23 simultaneously estimates the positions of the feature points and the position and attitude information of the camera with the registration information using a localization algorithm. In such a position estimating process, a process of converting the position of a space coordinate system into the position of an image coordinate system is performed.

A process of updating the position estimation state variables to estimate the position and attitude information of the camera, which is registered in the feature point registration unit 22, based on the position estimating result of the motion estimator 23 is performed by the feature point matching unit 24 and the observed amount updating unit 25.

The feature point matching unit 24 matches feature points extracted from a current image with registered feature points used for position estimation, and provides information necessary for the update of the position estimation state variables to the observed amount updating unit 25. Then, the observed amount updating unit 25 converts the information into a state variable such that the updated information is registered, sends the state variable to the feature point registration unit 22, and updates the position estimation state variables. A process including feeding back the position estimating result and updating the position estimation state variables is performed repeatedly.

Meanwhile, in order to secure reliability of localization performance, feature points which may be continuously observed are maintained and feature points having inherent feature amounts which are mutually distinguished are extracted. In order to satisfy such a restriction condition, the feature point extractor 21 segments the image into images having the same characteristics using the information received from the feature point matching unit 24.

For example, as shown in FIG. 2A, the actual image photographed using the camera includes the sky and a region having a complicated shape. The actual image may be segmented into a plurality of images according to the topographical characteristics in the region, as shown in FIG. 2B.

According to the example embodiments, affinity measures (m(X1, X2) to determine an affinity degree of the image are used as a criterion to segment the image and is defined by Equation 1. The affinity measures are defined by a variety of image information such as distance information, brightness information and material information of the image observed during position estimation. Since the image is segmented based on a variety of information, hierarchical image segmentation is used.

$$m(X1,X2)=\exp[-\{(|d(X1)-d(X2)|)/\sigma 2d\}-\{(|i(X1)-i(X2)|)/\sigma 2i\}-\{(|c(X1)-c(X2)|)/\sigma 2c\}]$$ Equation 1 where, X1 and X2 denote pixel coordinates, $|d(X1)-d(X2)|$ denotes a distance between two pixels in a space, $|i(X1)-i(X2)|$ denotes a difference in brightness level between two pixels, $|c(X1)-c(X2)|$ denotes a difference in material between two pixels, $\sigma 2d$ denotes a parameter to differentiate a distance difference, $\sigma 2i$ denotes a parameter to differentiate a brightness difference, and $\sigma 2c$ denotes a parameter to differentiate a material difference.

The affinity measures between pixels are calculated with respect to all the pixels of the image, and the calculated affinity measures become an element value configuring an affinity matrix.

The image may be segmented into images having the same characteristics by a process of analyzing the Eigen value of the affinity matrix and setting clustering groups having an Eigen value having a predetermined magnitude or more. That is, if reference values are differentially set in correspondence with the clustering groups and pixel sets are distinguished according to the magnitude of the Eigen value of the affinity matrix compared with the reference values, the actual image may be simply segmented as shown in the graph of FIG. 2B.

If the range of the reference values is adjusted, the number of segmented areas of the image may be changed, and thus a suitable number of segmented areas may be acquired according to a used environment.

Figure 3:
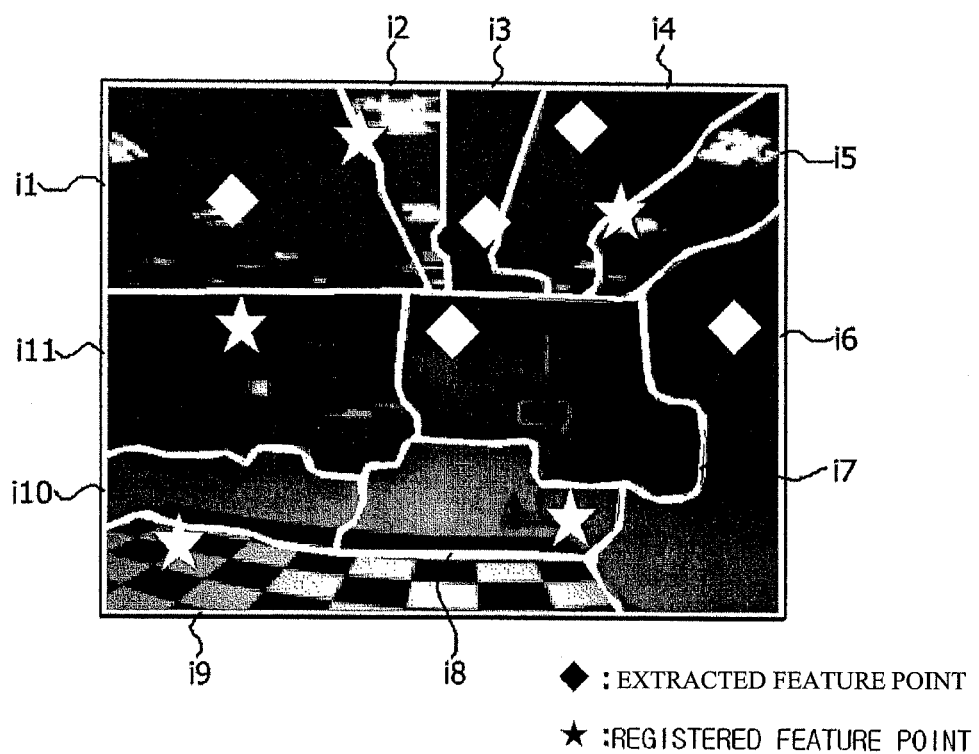
FIG. 3 is a view explaining feature points extracted from segmented images according to example embodiments.

Referring to FIG. 3, five segmented areas i2, i5, i8, i9 and i11 including registered feature points ☐ acquired from a previous image and five segmented areas i1, i3, i4, i6 and i7 including new points ◇ are included in 11 segmented areas i1 to i11 obtained from a current image.

The feature point extractor 21 extracts all feature points suitable for a feature point extracting condition from the current image and sends feature point information of all the extracted feature points to the feature point matching unit 24. Then, the feature point matching unit 24 matches the feature points used when the position estimation is performed by the motion estimator 23 with the feature points extracted by the feature point extractor 21, determines whether the extracted feature points are new feature points which are not registered, and provides the result to the feature point extractor 21.

Since the feature point extractor 21 which receives help from the feature point matching unit 24 may determine which of all the extracted feature points is the new feature point, only the feature point information of the new feature points extracted from the segmented areas in which the registered feature points are not included may be provided to the feature point registration unit 22.

Therefore, since the feature point information of the new feature points is added to the feature point registration unit 22 in addition to the registered feature points, current image information input from the camera may be applied.

As shown in FIG. 3, if the feature points are extracted from the segmented images having the same characteristics, the feature points become the representative feature points of the segmented images and a suitable number of feature points necessary for localization are extracted. Therefore, the feature points are uniformly extracted from the overall image and deterioration of localization performance due to the influence of an actual environment may be minimized, compared with conventional area segmentation methods.

When the photographing of the environment of the mobile object using the image input unit 10 is continuously performed while the localization system is operated, the extraction, registration and update of the feature points from the image information and the position estimation using the localization algorithm may be continuously performed by the localization unit 20.

Figure 4:
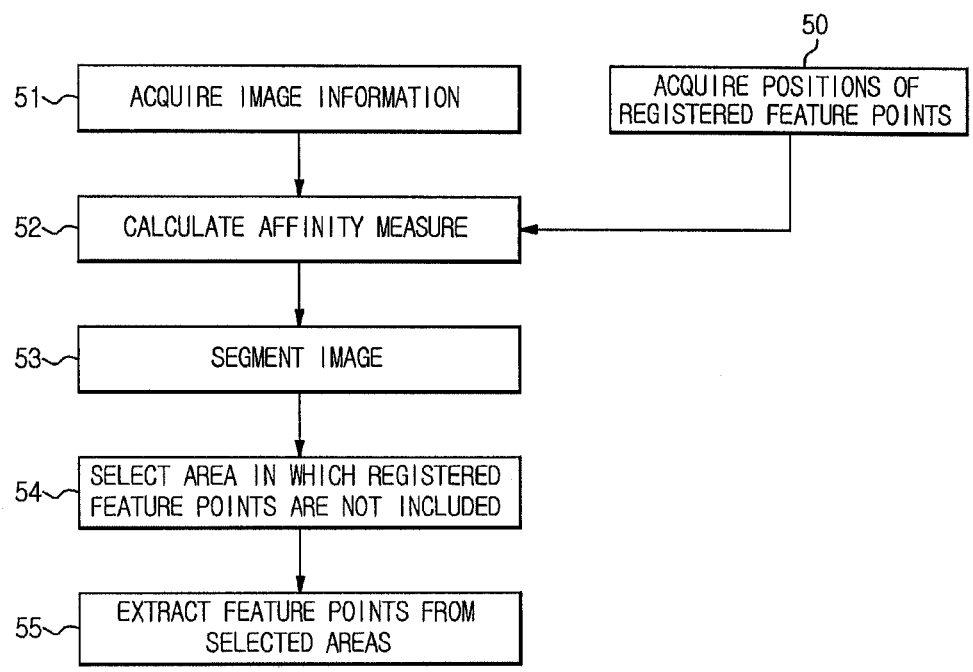
FIG. 4 is a flowchart illustrating a method of extracting feature points according to example embodiments.
Figure 5:
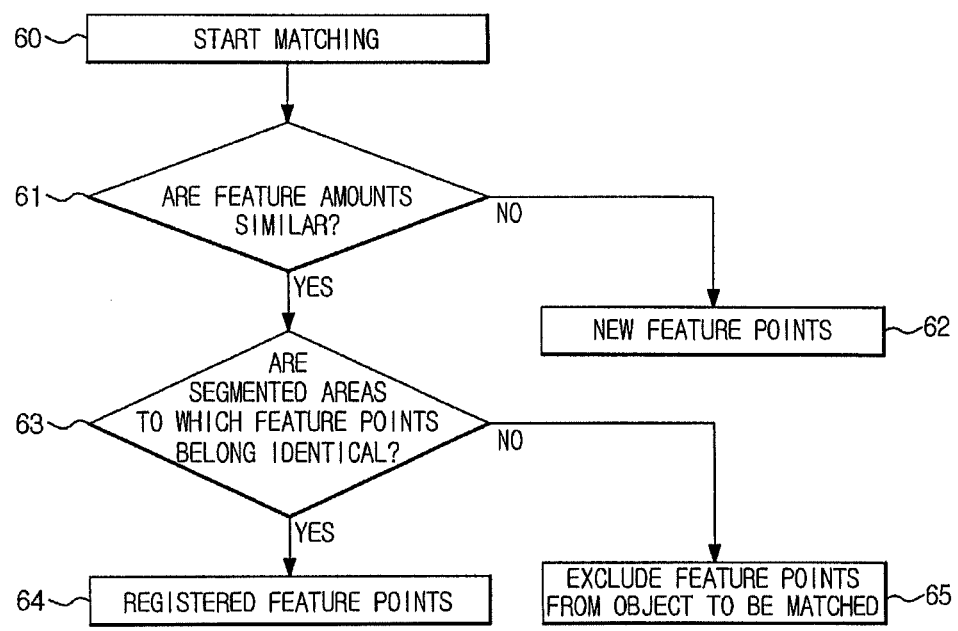
FIG. 5 is a flowchart illustrating matching of feature points according to example embodiments.

FIG. 4 is a flowchart illustrating a method of extracting feature points according to example embodiments, and FIG. 5 is a flowchart illustrating matching of feature points according to example embodiments.

As shown in FIG. 4, the positions of the registered feature points may be estimated by the position estimation result using the localization algorithm with the registration information of the feature point registration unit 22 (50).

The current image may be acquired by the image input unit 10 (51).

The feature point extractor 21, which receives a variety of information such as distance information, brightness information and material information observed during position estimation from the feature point matching unit 24, calculates affinity measures with respect to all the pixels of the current image by Equation 1 (52).

Then, the feature point extractor 21 configures the affinity matrix with the calculated affinity measures, analyzes the Eigen value of the affinity matrix to set clustering groups, and segments the current image into images having the same characteristics (53).

The feature point extractor 21 sends all the feature points extracted from the current image to the feature point matching unit 24. Since the estimated positions of the registered feature points are known, the feature point matching unit 24 matches all the extracted feature points with the feature points used for position estimation, detects new feature points, and sends the result to the feature point extractor 21.

The feature point extractor 21 selects the segmented areas in which the registered feature points are not included (54) and registers only the feature point information corresponding to the feature points extracted from the selected segmented images in the feature point registration unit 22 (55).

Meanwhile, although feature points are included in different areas, if the feature points have similar feature amounts, the feature points may be erroneously matched. Therefore, the following process is performed in view of such erroneous matching.

Referring to FIG. 5, the matching of the currently extracted feature points with the registered feature points begins (60). It is determined whether the feature amounts of the feature points to be matched are similar. If the feature amounts of the feature points to be matched are not similar (No in 61), the currently extracted feature points are set to the new feature points (62).

If the feature amounts of the feature points to be matched are similar (Yes in 61), it is determined whether the segmented areas to which the feature points belong are identical. If it is determined that the segmented areas to which the feature points belong are identical (Yes in 63), the feature points are deemed to be identical and are set to the registered feature points (64). In contrast, if it is determined that the segmented areas to which the feature points belong are not identical (No in 63), the currently extracted feature points are excluded from an object to be matched (65).

The feature point matching unit 24 performs matching by considering not only the feature amounts corresponding to the feature points but also the areas to which the feature points belong. Thus, erroneous matching may be prevented.

Figure 6:
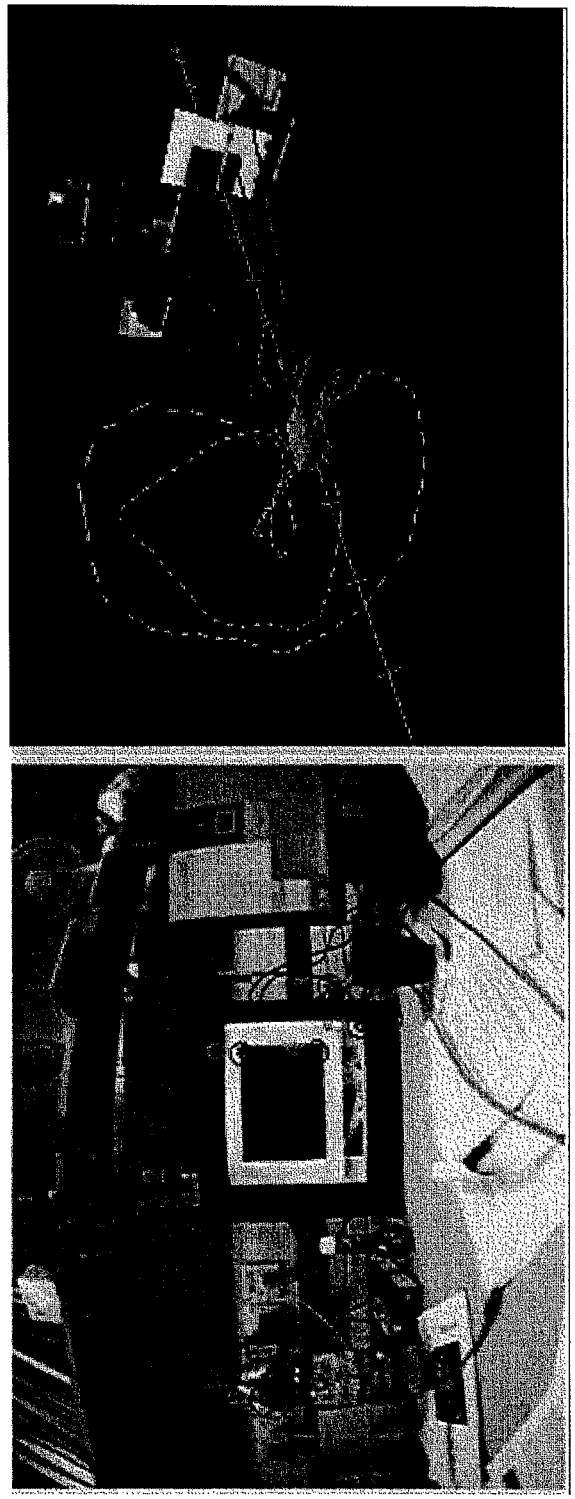
FIG. 6 is a view showing a simulation result of localization according to example embodiments.

The embodiments may be faithfully implemented in the image based localization field, from an experimental result (right) obtained by localization of an image (left) as shown in FIG. 6.

The positions of the feature points and the position and the attitude information of the camera may be continuously acquired using the localization algorithm with the registration information including the filter state variable of the feature points extracted from the segmented images having the same characteristics.

In addition, the extraction of the feature points according to the example embodiments may be applied to an image based localization apparatus such as a cleaning robot, a service robot or a humanoid robot.

The present embodiments are applicable to augmented reality, which has been spotlighted as a display technology in a ubiquitous environment such that stable augmented reality is implemented by localization.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. A method of extracting feature points, the method comprising:
    acquiring, by a processor, an image obtained by photographing an environment of a mobile object;
    segmenting, by the processor, the image according to an affinity degree of the acquired image; and
    extracting, by the processor, the feature points necessary for position estimation from a plurality of segmented areas obtained by segmenting the image.

2. The method according to claim 1, wherein the extracting of the feature points includes extracting all feature points from the image, matching all the extracted feature points with registered feature points used for position estimation, and detecting new feature points.

3. The method according to claim 2, wherein the matching of the feature points includes determining that the feature points are the new feature points if the feature amounts of the feature points are not similar and determining that the feature points are the registered feature points if the feature amounts are similar and the segmented areas which the feature points belong to are identical.

4. The method according to claim 1, wherein, if the registered feature points are included in at least one of the segmented areas, new feature points are extracted from segmented areas in which the registered feature points are not included.

5. The method according to claim 1, wherein the plurality of segmented areas is configured by images having the same characteristics.

6. The method according to claim 1, wherein the segmenting of the image includes calculating affinity measures between pixels with respect to all pixels of the image, configuring an affinity matrix containing the calculated affinity measures as an element value, comparing the magnitude of an Eigen value of the affinity matrix with reference values, and setting the segmented areas.

7. The method according to claim 6, wherein the reference values are differentially set in correspondence with the segmented areas.

8. The method according to claim 7, wherein the range of the reference values is adjusted such that the number of segmented areas is changed.

9. The method according to claim 6, wherein the affinity measures are defined by an Equation 1 using information observed during position estimation:
    the Equation 1 including:

$$m(X1,X2)=\exp[-\{(|d(X1)-d(X2)|)/\sigma^2_d\}-\{(|i(X1)-i(X2)|)/\sigma^2_i\}-\{(|c(X1)-c(X2)|)/\sigma^2_c\}]$$

where, X1 and X2 denote pixel coordinates, $|d(X1)-d(X2)|$ denotes a distance between two pixels on a space, $|i(X1)-i(X2)|$ denotes a difference in brightness level between two pixels, $|c(X1)-c(X2)|$ denotes a difference in material between two pixels, $\sigma^2_d$ denotes a parameter to differentiate a distance difference, $\sigma^2_i$ denotes a parameter to differentiate a brightness difference, and $\sigma^2_c$ denotes a parameter to differentiate a material difference.

10. The method according to claim 1, wherein the mobile object is any one of a mobile robot, a mobile phone and a camcorder, and takes a photograph using a camera included in any one of the mobile robot, the mobile phone and the camcorder.

11. An apparatus for extracting feature points, the apparatus comprising:
an image input unit to provide an image obtained by photographing an environment using a camera provided in a mobile object; and
a localization unit to analyze the image acquired by the image input unit so as to perform position estimation,
wherein the localization unit performs position estimation using feature points extracted from a plurality of areas which are segmented according to an affinity degree of the acquired image.

12. The apparatus according to claim 11, wherein the localization unit includes a feature point extractor to provide feature point information corresponding to the feature points extracted from the segmented areas, and a feature point registration unit to register the feature point information.

13. The apparatus according to claim 12, wherein the feature point extractor configures an affinity matrix containing affinity measures between pixels with respect to all pixels of the image, analyzes an Eigen value of the affinity matrix, and sets the segmented areas.

14. The apparatus according to claim 13, wherein the feature point extractor calculates the affinity measures using distance information, brightness information and material information of the pixels observed during position estimation.

15. The apparatus according to claim 12, wherein the localization unit further includes a motion estimator to simultaneously estimate the positions of the feature points and the position and attitude information of the camera using a localization algorithm with registration information of the feature point registration unit, and a feature point matching unit to match feature points used by the motion estimator during position estimation with feature points extracted from a current image by the feature point extractor and to detect new feature points.

16. The apparatus according to claim 15, wherein the feature point matching unit distinguishes between new feature points and registered feature points depending on whether the feature amounts of the feature points and the segmented areas which the feature points belong to are identical.

17. The apparatus according to claim 15, wherein the feature point extractor detects the new feature points with the help of the feature point matching unit and provides only feature point information of the new feature points extracted from the segmented areas, in which the registered feature points are not included, among the segmented areas to the feature point registration unit.

* * * * *